(12) United States Patent
Shahine et al.

(10) Patent No.: US 8,713,453 B2
(45) Date of Patent: Apr. 29, 2014

(54) PROGRESSIVELY DISCOVERING AND INTEGRATING SERVICES

(75) Inventors: Omar Shahine, Menlo Park, CA (US); Jeffrey C. Kunins, Seattle, WA (US); Douglas Ray Pearce, Seattle, WA (US); Ann Marie Hudspeth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 12/474,279

(22) Filed: May 29, 2009

(65) Prior Publication Data

US 2010/0306659 A1    Dec. 2, 2010

(51) Int. Cl.
*G06F 3/0481* (2013.01)

(52) U.S. Cl.
USPC ........... 715/753; 715/758; 709/202; 709/203; 709/219; 709/223; 726/8

(58) Field of Classification Search
USPC ........................................................ 715/733
See application file for complete search history.

(56) References Cited

U.S. PATENT DOCUMENTS

| | | | |
|---|---|---|---|
| 6,035,288 A * | 3/2000 | Solomon .......................... 705/37 |
| 6,624,831 B1 * | 9/2003 | Shahine et al. ................ 715/815 |
| 6,750,881 B1 * | 6/2004 | Appelman .................... 715/733 |
| 6,839,680 B1 * | 1/2005 | Liu et al. ...................... 705/7.33 |
| 7,032,006 B2 * | 4/2006 | Zhuk ............................. 709/206 |
| 7,093,020 B1 * | 8/2006 | McCarty et al. .............. 709/229 |
| 7,167,910 B2 * | 1/2007 | Farnham et al. .............. 709/223 |
| 7,243,105 B2 * | 7/2007 | Thint et al. ............................ 1/1 |
| 7,493,402 B2 * | 2/2009 | McCarty et al. ............... 709/229 |
| 7,673,327 B1 * | 3/2010 | Polis et al. .......................... 726/5 |
| 7,783,592 B2 * | 8/2010 | Armstrong et al. ........... 715/751 |
| 8,239,464 B2 * | 8/2012 | Colon ........................... 709/206 |
| 2005/0033660 A1 * | 2/2005 | Solomon ......................... 705/26 |
| 2005/0164704 A1 * | 7/2005 | Winsor ...................... 455/432.3 |
| 2005/0171799 A1 * | 8/2005 | Hull et al. ......................... 705/1 |
| 2005/0216300 A1 * | 9/2005 | Appelman et al. ................ 705/1 |
| 2005/0216550 A1 * | 9/2005 | Paseman et al. ............. 709/202 |
| 2006/0136344 A1 * | 6/2006 | Jones et al. ................... 705/402 |
| 2006/0136345 A1 * | 6/2006 | Jones et al. ................... 705/402 |
| 2006/0143043 A1 * | 6/2006 | McCallie et al. ................ 705/2 |
| 2006/0224675 A1 * | 10/2006 | Fox et al. ...................... 709/206 |
| 2007/0067444 A1 * | 3/2007 | McCarty et al. .............. 709/224 |
| 2007/0168444 A1 * | 7/2007 | Chen et al. ................... 709/207 |
| 2007/0174389 A1 * | 7/2007 | Armstrong et al. ........... 709/204 |
| 2007/0233291 A1 * | 10/2007 | Herde et al. .................... 700/91 |
| 2008/0046512 A1 * | 2/2008 | Jones et al. ................... 709/204 |
| 2008/0141137 A1 * | 6/2008 | Cleary et al. ................. 715/733 |

(Continued)

OTHER PUBLICATIONS

Trillian Astra, Trillian <http://www.trillian.im>, downloaded from wayback machine <http://web.archive.org> archived on Dec. 29, 2008.*

(Continued)

*Primary Examiner* — William Bashore
*Assistant Examiner* — Reza Nabi
(74) *Attorney, Agent, or Firm* — Bryan Webster; Andrew Sanders; Micky Minhas (57) ABSTRACT

Tools and techniques related to progressively discovering and integrating services are provided. These tools may receive electronic communications addressed to users of communications platform software. In turn, these tools may analyze the electronic communications, and generate upsells for presentation to the users. These upsells may relate to updating profile records associated with the users.

19 Claims, 6 Drawing Sheets

(56) References Cited

U.S. PATENT DOCUMENTS

| | | |
|---|---|---|
| 2008/0201447 A1* | 8/2008 | Kim .......................... 709/218 |
| 2008/0214157 A1* | 9/2008 | Ramer et al. ............... 455/414.1 |
| 2008/0255941 A1* | 10/2008 | Otto et al. ....................... 705/14 |
| 2009/0052645 A1* | 2/2009 | Bansal et al. ............ 379/202.01 |
| 2009/0070684 A1* | 3/2009 | Aldrich et al. ................ 715/743 |
| 2009/0172783 A1* | 7/2009 | Eberstadt ......................... 726/4 |
| 2009/0177744 A1* | 7/2009 | Marlow et al. ................ 709/204 |
| 2009/0182677 A1* | 7/2009 | Otto et al. ........................ 705/80 |
| 2009/0197580 A1* | 8/2009 | Gupta et al. ............... 455/414.2 |
| 2009/0222317 A1* | 9/2009 | Allen et al. ..................... 705/10 |
| 2009/0248476 A1* | 10/2009 | Trinh et al. ........................ 705/8 |
| 2009/0282144 A1* | 11/2009 | Sherrets et al. ............... 709/224 |
| 2009/0307610 A1* | 12/2009 | Ryan ............................... 715/756 |
| 2009/0319288 A1* | 12/2009 | Slaney et al. ...................... 705/1 |
| 2010/0049790 A1* | 2/2010 | Schreiber ...................... 709/203 |
| 2010/0057858 A1* | 3/2010 | Shen et al. .................... 709/206 |
| 2010/0057859 A1* | 3/2010 | Shen et al. .................... 709/206 |
| 2010/0076946 A1* | 3/2010 | Barker et al. ................. 707/705 |
| 2010/0146054 A1* | 6/2010 | Armstrong et al. ........... 709/205 |
| 2010/0174560 A1* | 7/2010 | Quan et al. ........................ 705/3 |
| 2010/0199340 A1* | 8/2010 | Jonas et al. ........................ 726/8 |
| 2010/0205541 A1* | 8/2010 | Rapaport et al. .............. 715/753 |
| 2010/0306075 A1* | 12/2010 | Drance et al. ................... 705/26 |
| 2011/0078028 A1* | 3/2011 | Glynias et al. .............. 705/14.73 |
| 2012/0054278 A1* | 3/2012 | Taleb et al. .................... 709/204 |
| 2012/0116800 A1* | 5/2012 | McCallie et al. ................. 705/2 |

OTHER PUBLICATIONS

Trillian Astra, Trillian <http://www.trillian.im>, downloaded from wayback machine <http:///web.archive.org> archived on Dec. 29, 2008, 17 pages.*

Alstyne, et al., "EmailNet: A System for Automatically Mining Social Networks from Organizational Email Communication", NAACSOS Conference 2003, Retrieved at <<http://ipresearch.net/emailnet/EmailNet-final.doc>>, Jun. 22-25, 2003, pp. 4.

Culotta, et al., "Extracting Social Networks and Contact Information from Email and the Web", First Conference on Email and Anti-Spam, Retrieved at http://www.cs.umass.edu/~culotta/pubs/culotta04extracting.pdf>>, Jul. 30-31, 2004, pp. 8.

Van Der Aalst, et al., "EMailAnalyzer: An E-Mail Mining Plug-in for the ProM Framework", BPM Center Report BPM-07-16, Retrieved at <<http://is.tm.tue.nl/staff/wvdaalst/publications/p453.pdf>>, 2007, pp. 26.

Perez, Sarah, "Xobni: Social Network in Your Inbox", Retrieved at <<http://www.readwriteweb.com/archives/xobni_social_network_in_your_inbox.php>>, Jan. 14, 2008, pp. 1-3.

Agarwal, Amit, "Extract Email Addresses from Messages in Outlook Folders", Retrieved at <<http://www.labnol.org/internet/email/extract-email-addresses-outlook-inbox-message-folders/2169/>>, Jan. 28, 2008, p. 1.

* cited by examiner

PROGRESSIVELY DISCOVERING AND INTEGRATING SERVICES

BACKGROUND

Social networks continue to proliferate, gaining members around the world. Typically, a given member of a social network may invite friends or acquaintances to join that social network. A given member of a social network may define his or her complete profile information, with this profile information providing various contact, personal, or other information related to that given member.

SUMMARY

Tools and techniques related to progressively discovering and integrating services are provided. These tools may receive electronic communications addressed to users of communications platform software. In turn, these tools may analyze the electronic communications, and generate upsells for presentation to the users. These upsells may relate to updating profile records associated with the users.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description provides tools and techniques for progressively discovering and integrating services. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques related to progressively discovering and integrating services.

Figure 1:
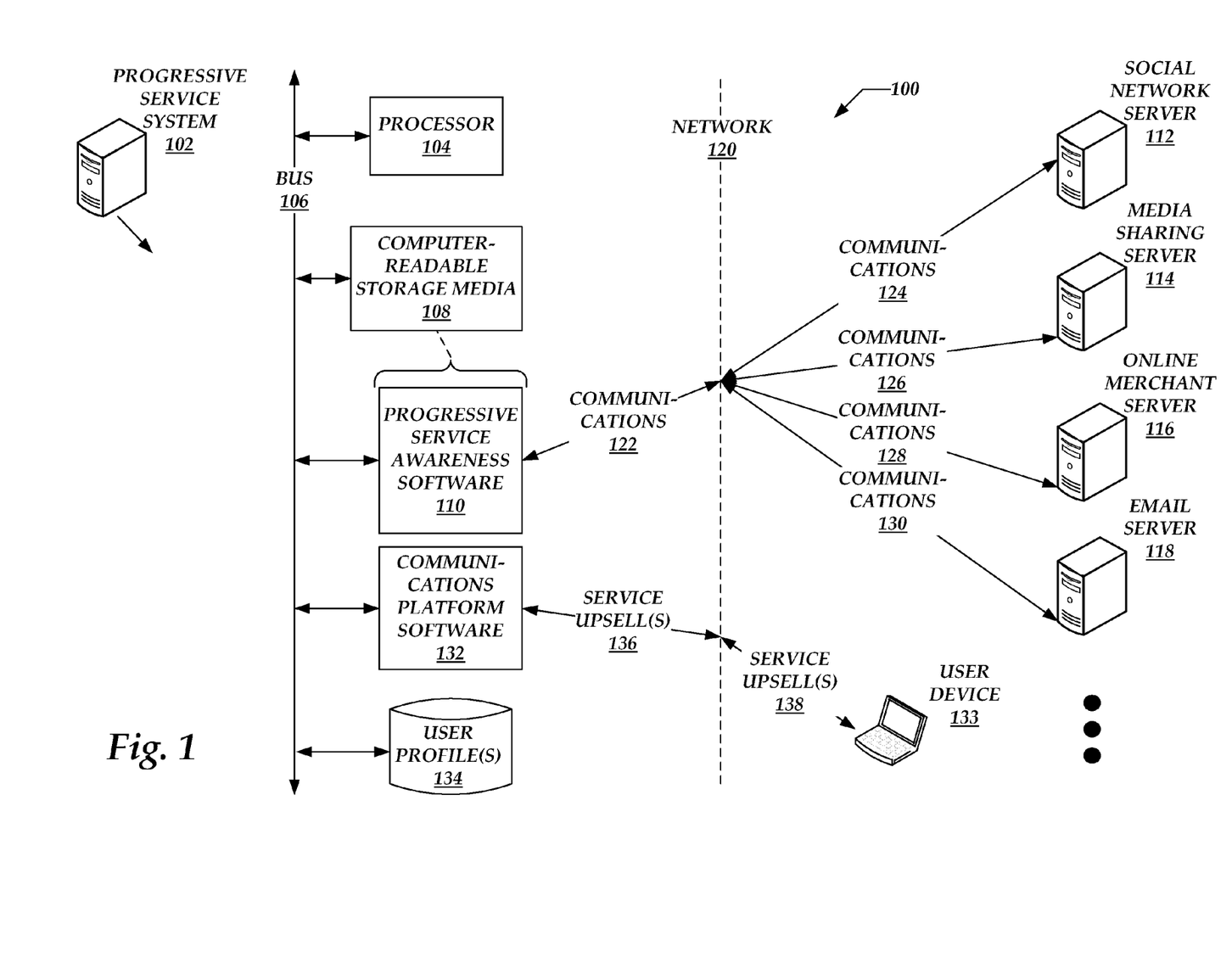
FIG. 1 is a combined block and flow diagram illustrating systems or operating environments related to progressively discovering and integrating services.

FIG. 1 illustrates systems or operating environments, denoted generally at 100, related to progressively discovering and integrating services. Turning to FIG. 1 in more detail, these systems 100 may include any number of progressive service systems 102. Although FIG. 1 illustrates one example of the progressive service system 102, implementations of this description may include any number of progressive service systems 102.

Only for the purposes of illustration, this description discusses examples in which the progressive systems 102 operate in connection with one or more social networking systems or communications platforms. However, it is understood that this description may be implemented more generally. For example, implementations of this description may operate in any system that supports some number of different users, with different users associated with respective profile information. As described in further detail below, these profile management systems may receive and analyze communications incoming to any number of different users, identify any third-party services involved with those communications, and offer to update profile information associated with the users with information pertaining to these third-party services.

Turning to the progressive service systems 102 in more detail, these systems may include one or more instances of processing hardware, with FIG. 1 providing a representative processor 104 as an example of such processing hardware. The processors 104 may have a particular type or architecture, chosen as appropriate for particular implementations of the progressive service system 102. In addition, the processors 104 may couple to one or more bus systems 106, having type and/or architecture that is chosen for compatibility with the processors 104.

The progressive service systems 102 may include one or more instances of a physical computer-readable storage medium or media 108, which may couple to the bus systems 106. The bus systems 106 may enable the processors 104 to read code and/or data to/from the computer-readable storage media 108. The media 108 may represent apparatus in the form of storage elements that are implemented using any suitable technology, including but not limited to semiconductors, magnetic materials, optics, or the like. The media 108 may represent memory components, whether characterized as RAM, ROM, flash, solid-state hard drive, or other types of technology.

The storage media 108 may include one or more modules of software instructions that, when loaded into the processors 104 and executed, cause the progressive service systems 102 to execute software in connection with progressively discovering and integrating services. As detailed throughout this description, these modules of instructions may also provide various tools or techniques by which the progressive service systems 102 may participate within the overall systems or operating environments described herein using the components, message and command flows, and data structures discussed in more detail throughout this description. For example, the storage media 108 may contain one or more modules 110 that contain progressive service awareness software. The progressive service awareness software 110 may include software instructions that are configured to perform the functions described herein in connection with providing progressively discovering and integrating services.

In general, the software 110 may, when loaded into the processors 104 and executed, transform the processors 104 (and the overall progressive service systems 102) from general-purpose computing systems into special-purpose computing systems customized to present integrated advertising content. The processors 104 may be constructed from any number of transistors or other discrete circuit elements, which may individually or collectively assume any number of states. More specifically, the processors 104 may operate as finite-state machines, in response to executable instructions contained within the software 110. These computer-executable instructions may transform the processors 104 by specifying how the processors 104 transition between states, thereby physically transforming the transistors or other discrete hardware elements constituting the processors 104.

Encoding the software 110 may also transform the physical structure of the storage media 108. The specific transformation of physical structure may depend on various factors, in different implementations of this description. Examples of such factors may include, but are not limited to: the technology used to implement the storage media 108, whether the storage media 108 are characterized as primary or secondary storage, and the like. For example, if the storage media 108 is implemented as semiconductor-based memory, the software 110 may transform the physical state of the semiconductor memory, when the software is encoded therein. For example, the software may transform the states of transistors, capacitors, or other discrete circuit elements constituting the semiconductor memory.

As another example, the storage media 108 may be implemented using magnetic or optical technology. In such implementations, the software 110 may transform the physical state of such magnetic or optical media, when the software 110 is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Turning to the software 110 in more detail, this software 110 may facilitate communications between any number of additional services. FIG. 1 provides examples in which the software 110 may communicate with one or more servers 112 associated with third-party social networks, one or more servers 114 associated with third-party media-sharing services (e.g., photo, video, or image sharing), one or more servers 116 associated with online merchants, one or more servers 118 associated with e-mail services, and the like.

As shown in FIG. 1, the progressive service systems 102 may communicate with any number of third-party servers (e.g., 112-118) over one or more intermediate communications networks 120. The networks 120 may generally represent global, wide-area, regional, local-area, or personal networks. In addition, the networks 120 may represent network adapters, connectors, cabling and other hardware infrastructure associated with the foregoing communications networks, as well as any drivers or software associated with communicating through the networks 120.

FIG. 1 denotes at 122 communications to and/or from the network 120. These communications 122 may represent communications 124 to and/or from the social network server 112, communications 126 to and/or from the media sharing server 114, communications 128 to and/or from the online merchants server 116, communications 132 and/or from the e-mail server 118, and other types of communications not shown in FIG. 1. Examples of these communications 122-130 may include e-mails, instant messages (IMs), or other types of notifications involving subject matter handled by the servers 112-118.

The storage media 108 may also include communications platform software 132, which may communicate with the progressive service software 110 over the bus systems 106. In general, the communications platform software 132 may enable any number of member users to communicate with other users. For example, these member users may be associated with selected user devices 133. Accordingly, the communications platform software may maintain any number of respective user profiles 134 associated with these member users.

Turning to the user profiles 134 in more detail, the user profiles 134 may include any number of storage elements that cooperate with the software 110 and 132 during execution. For example, the user profiles 134 may include an address book data structure that contains contact information or other types of information associated with any number of different users. This address book structure may reside physically on the progressive service system 102 and/or the user devices 133. For example, a given user associated with the user device 133 may maintain an instance of the address book structure to contain contact information associated with other users. Through the communications platform software 132, this given user may maintain relationships with any number of other particular users (e.g., "friends"), and communicate with these other users through any suitable communications mechanism.

The progressive service systems 102 and/or the user devices 133 may maintain the user profiles 134 in connection with, for example, social networks facilitated by the progressive service systems 102. The user profiles 133 may include contact information, demographic information, interest information, or only other information maintained for different users. In a social network context, the user profiles 134 for different given users may include, but are not limited to, names, e-mail addresses, telephone numbers, usernames, birthdays, identification of third-party services or websites of interest to those given users, areas of interest, and the like. Other examples of information contained within the user profiles 134 may become apparent after reading this description, and are considered within the scope of this description.

As described in further detail below, the software 110 may process information representing the communications 122-130, and generate any number of service upsells. In turn, the communications platform software 132 may communicate the service upsells to the users, as represented at 136 and 138. These service upsells 136 and 138 may involve offers for the users to integrate representations of third-party services into their user profile information.

Figure 2:
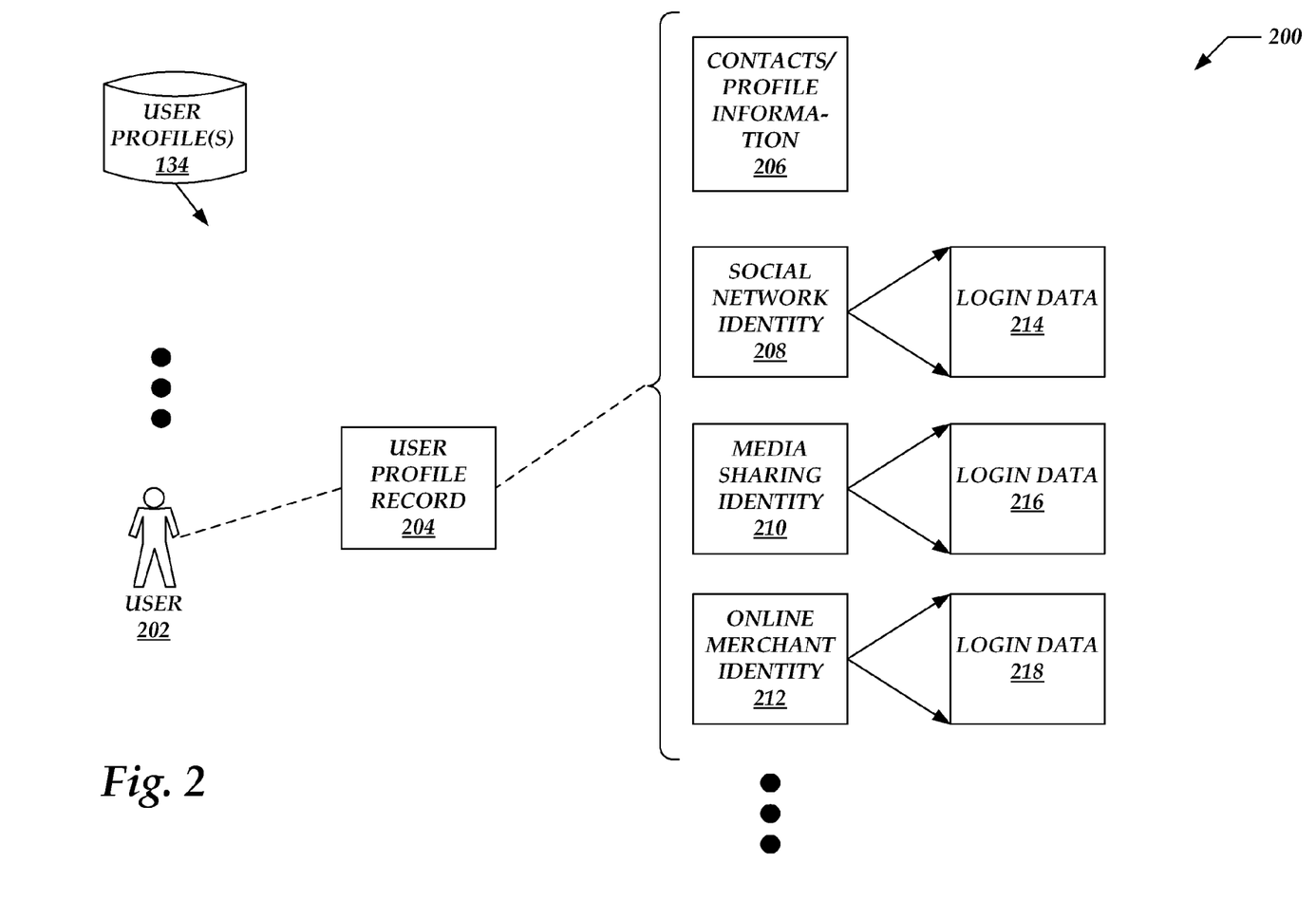
FIG. 2 is a block diagram of data structures or hierarchies that may be suitable for implementing user profiles as shown in FIG. 1.

FIG. 2 illustrates examples of data structures or hierarchies, denoted generally at 200, that may be suitable for implementing the user profiles 134 shown in FIG. 1. For the purposes of this description, FIG. 2 is discussed from the perspective of user profile information maintained for a given user 202. This user 202 may be a member of a social network maintained by the communications platform software 132. However, it is understood that implementations of this description may include user profile information for any number of different users.

Turning to the user profiles 134 in more detail, a given member user 202 may be associated with a corresponding user profile record 204. For that given member user 202, the user profile record 204 may contain in any suitable type of contact or profile information, denoted generally at 206. The contact or profile information may include any of the examples described above.

In addition, the user profile records 204 may indicate any third-party services associated with that member user 202. For example, the user profile records 204 may include records 208 indicating any social networks or services of which the given user 202 is a member. The user profile record 204 may include records 210 indicating any media sharing services of which the user 202 is a member, and may include records 212 indicating any online merchants with which the user 202 are forms transactions. For example, the records 208-212 may include information representing identities of the given user 202 in the context of social networks, media sharing services, online merchants, and the like. Other examples of third-party services are possible in implementations of this description, with the foregoing examples provided only for the purposes of illustration.

In addition, the records 208-212 may be associated with respective login data 214-218, by which the given user 202 may login to access services associated with, for example, social networks, media sharing services, online merchant accounts, and/or the like. In some cases, at least the given user 202 may explicitly provide some information associated with the various third-party services represented at 208-212. In other cases, this information associated with the third-party services may be inferred, as described further below, based upon content of the communications 122-130.

Figure 3:
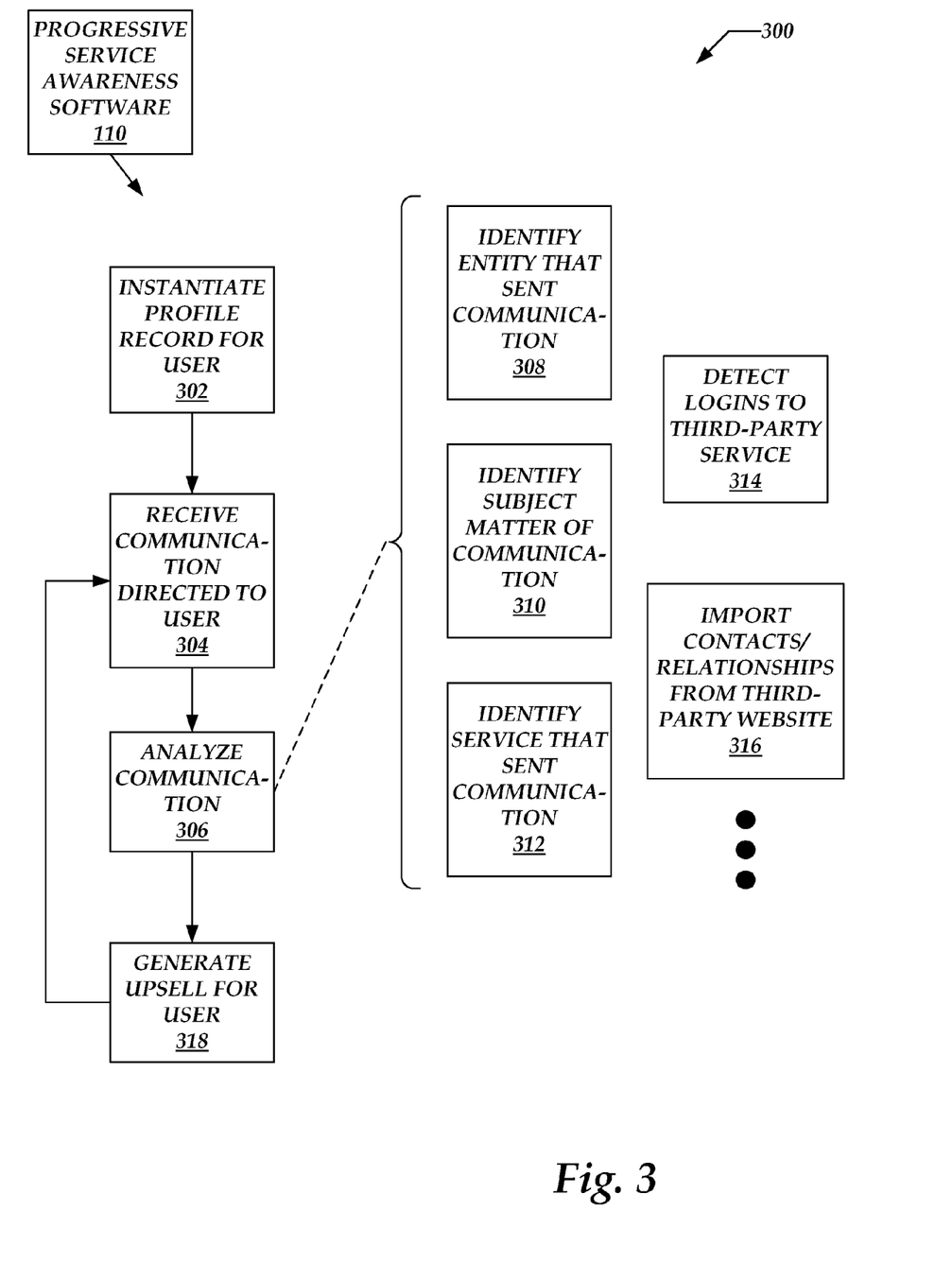
FIG. 3 is a flow chart illustrating processes for analyzing incoming communications and generating service upsell offers based on those communications.

FIG. 3 illustrates process flows, denoted generally at 300, related to assessing incoming communications and generating service upsell offers based on those communications. For ease of description, but not to limit possible implementations of this description, the process flows 300 are described in connection with the software 110. In some implementations, the progressive service system 102 may operate the software 110 on behalf of representative user devices (e.g., 133) associated with areas different users (e.g., 202). In other implementations, the user devices 133 may themselves execute the software 110. Accordingly, the process flows 300 may be understood as elaborating on processing that the software 110 may perform. However, other components may perform at least parts of the process flows 300 without departing from the scope and spirit of this description.

Turning to the process flows 300 more detail, block 302 represents instantiating at least one profile record (e.g., 204) for at least one given user (e.g., 202). In some implementation scenarios, block 302 may also include enabling the given user to populate at least portions of the profile record.

Block 304 represents receiving at least one communication directed to the given user. Block 304 may include receiving communications (e.g., one or more e-mails) directed to the given user through communications platform software (e.g., 132). FIG. 1 provides examples of such communications at 122-130.

Block 306 represents analyzing the communication received in block 304 to progressively discover any services used by a given user. For example, if the given user maintains an account on a photo-sharing website, that user may upload and post any number of images or photos on the photo-sharing website under his or her account. In turn, the given user may invite other users to view these uploaded images or photos. The photo-sharing website may provide a communications mechanism, by which other users may comment on these uploaded images or photos. Accordingly, block 306 may include analyzing such comments. However, other implementation scenarios may involve the given user receiving comments directed to content posted on a social networking site, or other types of sites as well. In addition, block 306 may include analyzing communications sent by online merchants to the given user.

As shown in FIG. 3, block 306 may include, when analyzing a given communication, identifying an entity that sent the communication, or on whose behalf the communication was sent. Returning to the above photo-sharing example, block 306 may include identifying which user commented on the photo posted by another user. In general, block 308 represents identifying an entity that sent a given communication. In addition, block 308 may include analyzing the given communication against a list of services of interest. These services of interest may be organized into catalogs or other suitable structures, with these catalogs containing entries corresponding to services that may be offered as upsells to users. The services of interest represented in the catalogs may be dynamic, in that these services may change over time.

Block 306 may also include identifying a subject matter involved in a given communication, as represented generally at block 310. For example, returning to the above photo-sharing example, block 310 may include determining that a given communication involves one user commenting on photos or other content posted by another user on a photo-sharing site. As another example, block 310 may include determining that a given communication relates to a transaction involving an online merchant.

Block 306 may also include identifying a service that sent a given communication among as represented generally at block 312. For example, returning to the photo-sharing example above, block 312 may include determining that a given communication originated from the photo sharing service. In other non-limiting examples, block 312 may include determining that a given communication originated from an online merchant, a social network site, and the like.

Elaborating further on possible implementations of block 306, block 314 may include receiving indications that a user is logging into a third party website or service. For example, block 314 may include using a toolbar plug-in or browser associated with that third party service to detect natively that the user is accessing that third party service. In turn, the upsell operations described below may reference these third party websites or services (e.g., offering to enable the user to log into the third party website from within the communications platform software 132 shown in FIG. 1). More specifically, this upsell offer may include messaging such as: "We noticed that you often log into {third-party website} to {third-party service}. Would you like to log into {third-party website}, so that you can {third-party service}?"

In other possible implementations of block 306, block 316 may represent importing lists of contacts or associations from a third-party website, social network, service, or the like. For example, block 316 may include detecting that a given user and at least one other user share some relationship (e.g., "friends") on the third-party website. In turn, an upsell offered to the given user may reference this third-party website, as well as any relationships with the other users. More specifically, this upsell offer may include messaging such as: "We noticed that you are friends with John Smith on {third-party website}. Would you like to log into {third-party website}, so that you can chat with John?"

In general, blocks 306-316 may involve analyzing different communications that are directed to a given user, to identify third-party services involved in those communications. In addition, blocks 306-316 may involve identifying those entities that originated the communications. Block 318 represents generating at least one offer to integrate the third-party services identified in blocks 306-316 into profile information associated with the given user. In the context of this description, these offers to integrate third-party services are referred to as offers to "upsell" the given user to integrate these third-party services into his or her user profiles.

Examples of the upsell offers may include, but are not limited to, offers to integrate the third-party services into profile or account information associated with the communications platform software 132. For example, if a given user receives comments from other users regarding photos posted by that given user on a photo-sharing website, the example upsell may include offering to enable that given user to access the photo-sharing website from within the communications platform software 132.

It is noted that the process flows 300 as shown in FIG. 3 may be performed without active involvement by the user. For example, the process flows 300 may be performed as a background process in which incoming communications directed to different users are analyzed, with the upsell offers being generated for presentation to users later.

Figure 4:
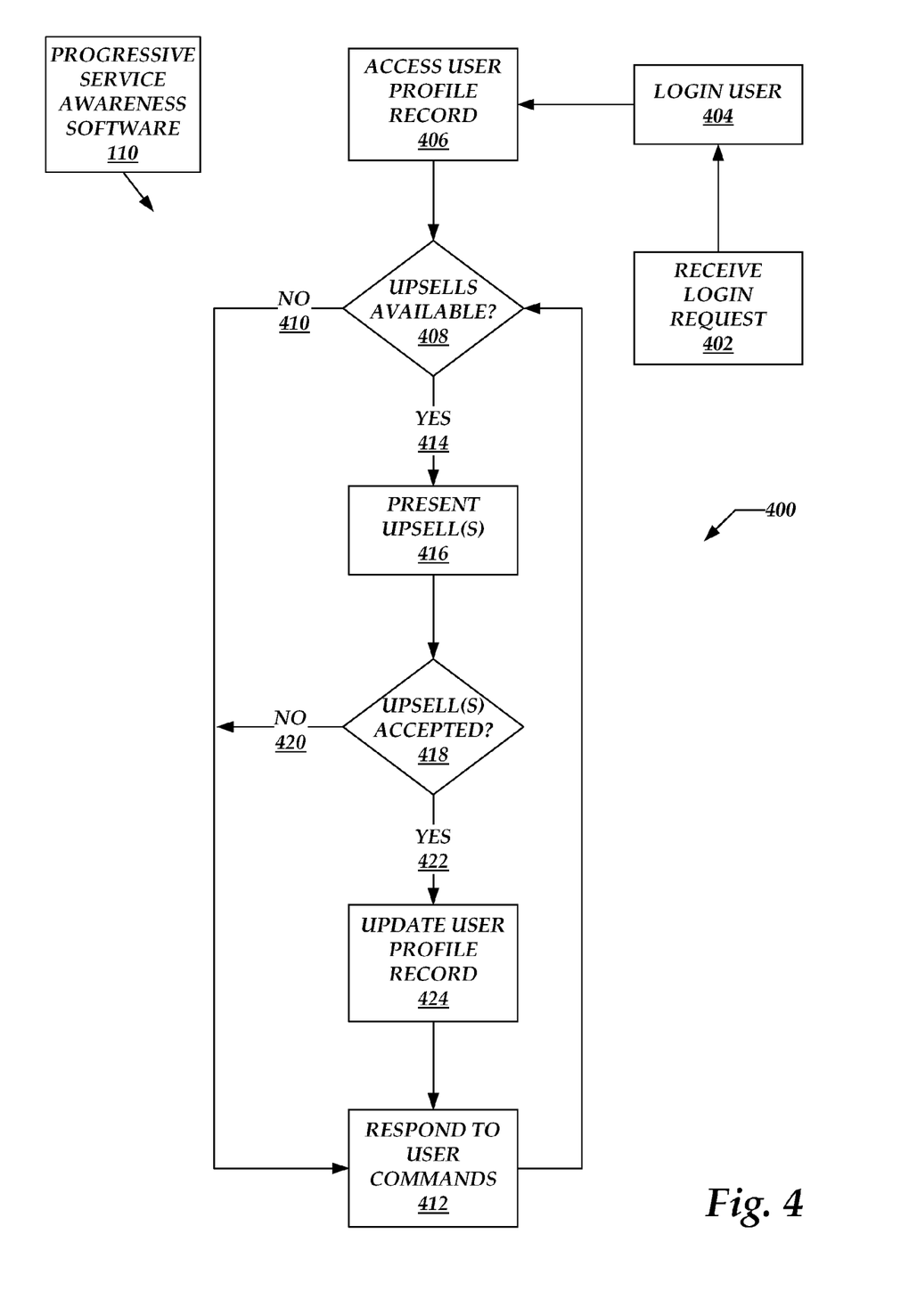
FIG. 4 is a flow chart illustrating processes for presenting generated upsell offers to users, and for processing user responses to these upsell offers.

FIG. 4 illustrates process flows, denoted generally at 400, or presenting the generated upsell offers to users, and processing user responses to these upsell offers. For ease of description only, the process flows 400 are described in connection with the software 110. However, implementations of this description may perform at least portions of the process flows 400 with other components, without departing from the scope and spirit of this description.

Block 402 represents receiving a login request from a given user. For example, block 402 may include enabling the given user to log into an account established on or by the communications platform software 132 shown in FIG. 1. In turn, block 404 represents logging the given user into this account, assuming that the user authenticates himself or herself as appropriate.

Block 406 represents accessing a profile record associated with the user who logged in. FIG. 2 provides examples of user profile records at 204. In addition, the user profile records 204 include one or more upsell service offers (e.g., 136 and 138 in FIG. 1). In some implementations, the upsell service offers may be generated using the process flows 300 shown in FIG. 3.

Decision block 408 represents determining whether any upsell offers have been generated for the user who logged in during blocks 402 and 404. If no upsell offers are available for that user, the process flows 400 may take No branch 410 directly to block 412. Block 412 represents responding to any commands the user issues while interacting with, for example, the communications platform software 132.

Returning to decision block 408, if upsell offers are available for that user, the process flows 400 may take Yes branch 414 to block 416. Block 416 represents presenting one or more upsell offers to that user for consideration. In turn, decision block 418 represents determining whether user has accepted the upsell offer presented in block 416.

From decision block 418, if the user ignores or rejects the upsell offer presented in block 416, the process flows 400 may take No branch 420 to block 412, which was described above. However, from decision block 418, if the user accepts the upsell offer, the process flows 400 may take Yes branch 422 to block 424.

Block 424 represents updating the profile record for the given user, in light of the accepted upsell offer. For example, returning to the above upsell example, in which the given user is offered the capability to access a photo-sharing website from within the communications platform software 132, block 424 may include updating the profile record associated with the given user, such that the given user may sign into the photo-sharing website from within the communications platform software 132. In this example, block 424 may include updating the profile record with login information associated with the photo-sharing website.

Figure 5:
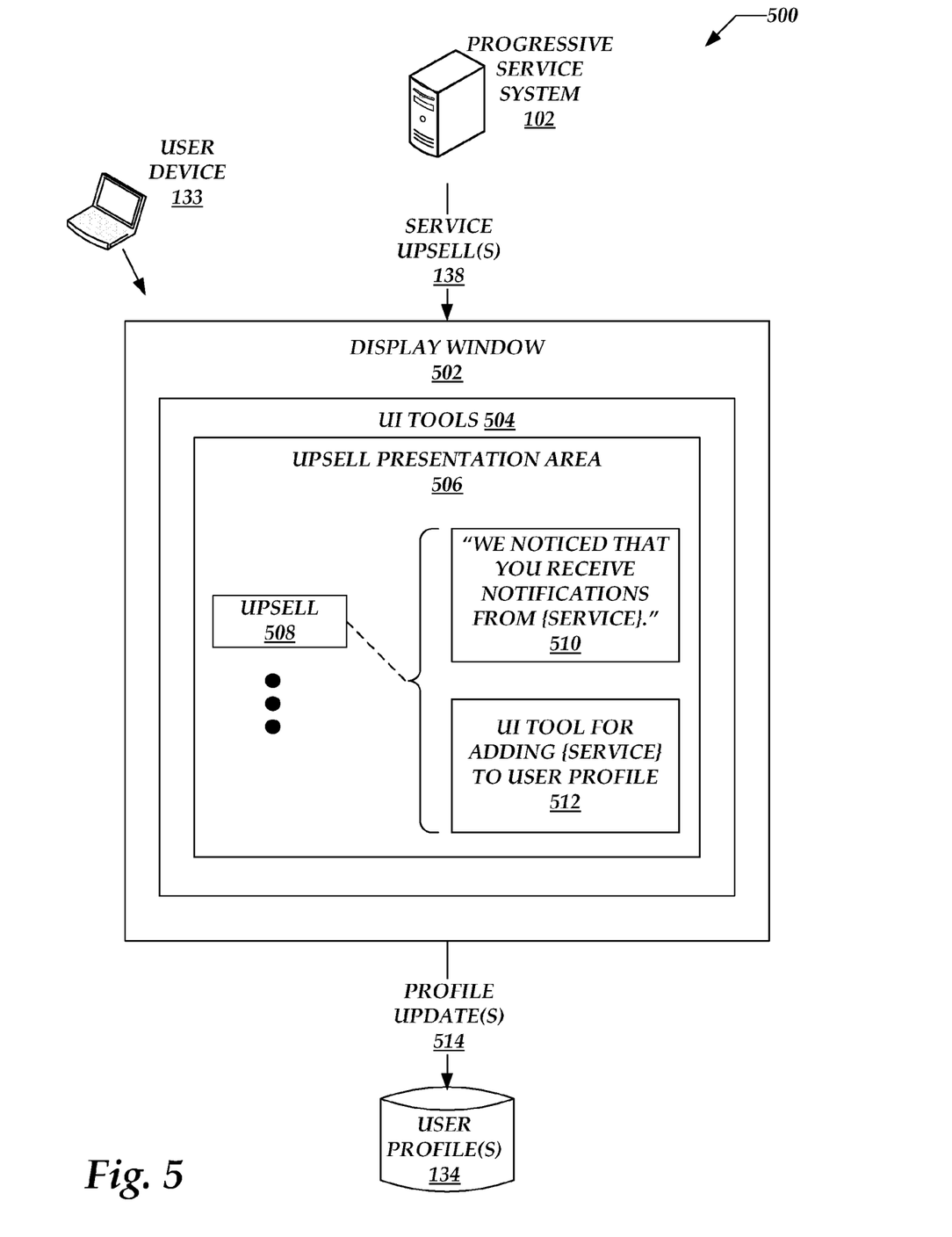
FIG. 5 is a block diagram illustrating user interfaces (UIs) for presenting representations of generated upsell offers to a given user.
Figure 6:
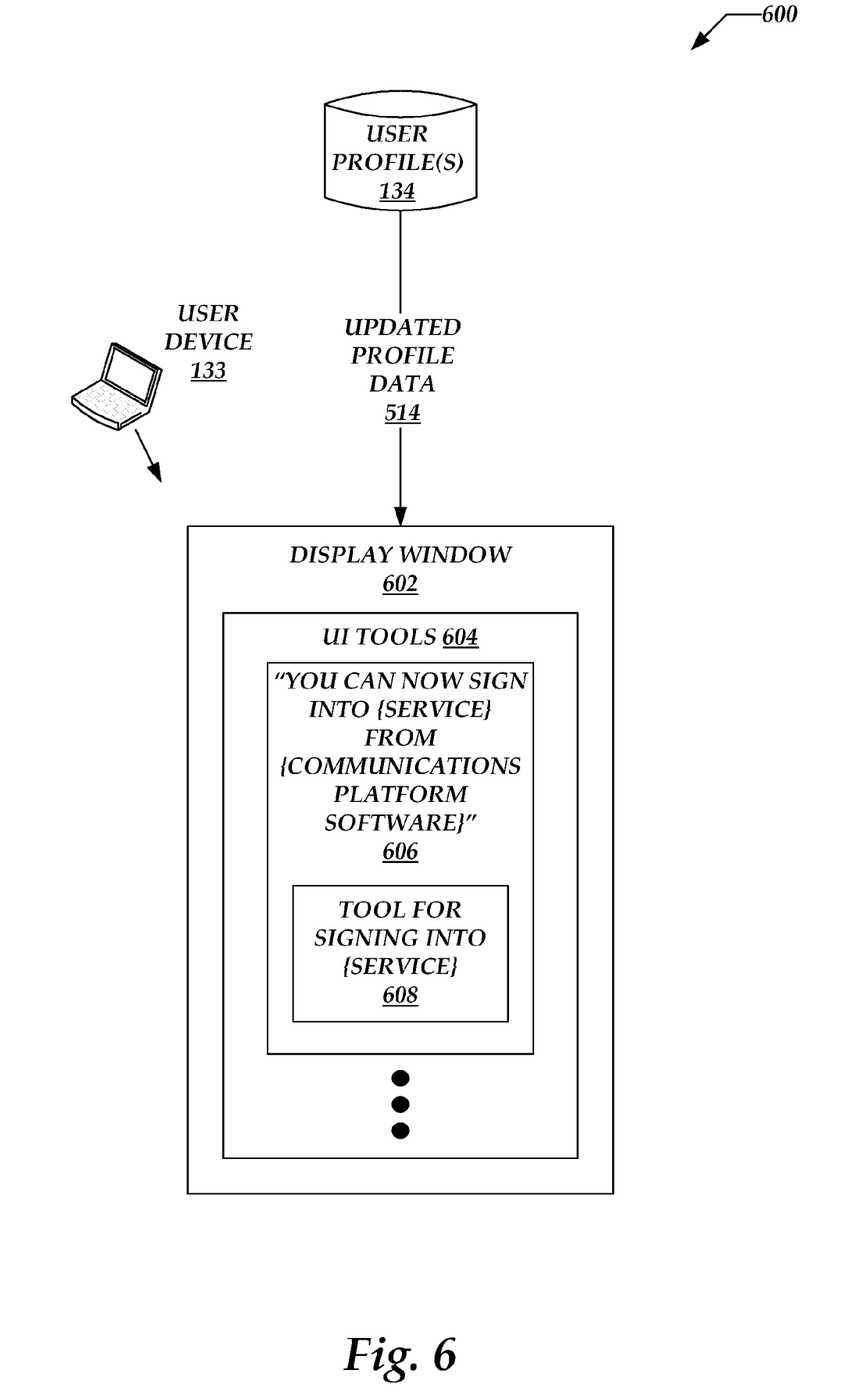
FIG. 6 is a block diagram illustrating UIs that enable a given user to access third-party services from within communications platform software.

As appreciated from the foregoing description, the process flows 400 may be performed, at least in part, any number of times to process upsells generated for any number of different users. FIGS. 5 and 6 described below illustrate user interfaces (UIs) that may cooperate with the process flows 300 and 400 shown in FIGS. 3 and 4.

FIG. 5 illustrates user interfaces (UIs), denoted generally at 500, for presenting representations of generated upsell offers to a given user. For convenience of description, the UIs 500 are described in connection with service upsells (e.g., 138) sent by a progressive service system (e.g., 102) to a given user device Turning to the user interfaces 500 in more detail, a display window 502 may appear on display hardware provided by the user device 133. For example, the software 110 or 132 may create and populate the display window 502.

A dialog box 504 may provide various UI tools and devices by which the given user may view representations of upsell offers. For example, the dialog box 504 may include an upsell presentation area 506, which may contain representations 508 of any number offered service upsells. These upsell representations 508 may be associated with explanatory labels 510, which may provide context or explanation regarding the transactions or communications that led to generation of a given upsell offer. For example, if a given user receives notifications or communications from a photo-sharing service, the labels 510 may include a message indicating that notifications or communications from this photo-sharing service led to generation of the upsell offer. As shown at 510, examples of these labels may include a message that "We noticed that you receive notifications from {service}", where {service} represents any of the third party services described herein.

The upsell representation 508 may also be associated with a UI tool 512 that is responsive to user input to accept the upsell offer represented at 508. For example, the UI tool 512 may respond to user activation to add information related to the {service} to a profile associated with a given user, such that the given user may log into and access the {service} from within the communications platform software 132.

Assuming that the user activates the UI tool 512 for a given upsell, updated profile information 514 may be added to the user profiles 134. For example, this profile information 514 may be used to update any of the example records 208-212 shown in FIG. 2, such that the user may access the {service} presented in the upsell represented at 508.

It is noted that the upsell presentation area 506 may include representations 508 of any number of upsell offers relating to any number of different services. Accordingly, it is understood that the upsell presentation area 506 and upsell representation 508 are presented in FIG. 5 only for convenience of illustration. In addition, the progressive service system 102 may generate and transmit different service upsells 138 for presentation on different user devices 133.

FIG. 6 illustrates user interfaces (UIs), denoted generally at 600, that enable a given user to access third-party services from within communications platform software. For example, the UIs 600 may be presented in connection with third-party services that were upsold and accepted through the UIs 500 shown in FIG. 5. For convenience of description, but not to limit possible implementations, the UIs 600 are described in connection with the user profiles 134 and the user device 133. More specifically, the UIs 600 may be populated from the updated profile data 514 retrieved from the user profiles 134.

Turning to the UIs 600 in more detail, a display window 602 may be presented on display hardware provided by the user device 133. In turn, the display window 602 may present one or more UI tools 604 associated with, for example, communications platform software (e.g., 132 in FIG. 1). These UI tools 604 may present messages 606, indicating to a given user that he or she may access one or more third-party services from within the communications platform software 132. In the non-limiting example provided in FIG. 6, the messages 606 may indicate that "You can now sign into {service} from {communications platform software}", where the {service} corresponds to any third-party services described above in connection with the example servers 112-118, and where the {communications platform software} corresponds to the software 132.

The UI tools 600 may also include a tool 608 that is responsive to user input or activation to sign the user into the {service}. When the UIs 600 are presented to a given user, that given user may sign into the {service} by activating the tool 608.

While FIG. 6 illustrates a single instance of the messages 606 and UI tools 608, implementations of the UIs 600 may include any number of such instances. Accordingly, the UIs 600 may enable a given user to sign into any number of third-party services using respective instances of the tools 608.

In addition to the items shown in FIGS. 5 and 6, the UIs 500 and 600 may include other elements or tools. For example, the UIs 500 may include representations of profile information and status, along with contact information and the like. In other examples, the UIs 600 may include representations of users who have a "friend" relationship with a given user logged into the communication platform software 132.

Having described the tools and techniques for progressively discovering and integrating services in connection with FIGS. 1-6, several observations are noted. The system 102 and the software 110 are described as "progressive", in the sense that as incoming communications 122-130 directed to a given user arrive over time, these communications may provide evidence that the given user utilizes various third-party services. Accordingly, the given user's profile may benefit from including representations of these third-party services, because that user's "friends" may then learn that the given user uses those third-party services. In turn, these third-party services may provide additional avenues of interaction between the given user and his or her "friends".

Over time, the tools described herein may analyze these incoming communications, identify third-party services represented in those transactions, and present upsells offering to integrate these third-party services into user profiles. Assuming these upsells are accepted, representations of the third-party services are integrated into the user profiles, and become visible to associates of different given users. The tools and techniques described herein may thus automatically generate the upsell offers for these third-party services. In this manner, users may accept the offered upsells to integrate these third-party services into their profiles without laboriously discovering and integrating these third-party services themselves.

The foregoing description provides tools and techniques for progressively discovering and integrating services. Although this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. An apparatus comprising at least one physical computer-readable storage medium having stored thereon computer-executable instructions that, when loaded into at least one hardware processor and executed, transform the at least one hardware processor to perform the following:
   receive at least one electronic communication addressed to at least one user of communications platform software;
   analyze the at least one electronic communication to identify at least one third-party service that sent the at least one electronic communication; and
   generate at least one upsell service offer for presentation to the user based on analyzing the at least one electronic communication,
   wherein the at least one upsell service offer comprises
      at least one offer to the at least one user to log into at least one third-party website from within the communications platform software to access the at least one third-party service,
      access information configured to allow the at least one user to access the at least one third-party service, the access information being integrated into a profile record associated with the at least one user upon acceptance by the at least one user of the at least one upsell service offer, and
      at least one message indicating the at least one electronic communication from the at least one third-party service that led to generation of the at least one upsell service offer.

2. The apparatus of claim 1, further comprising instructions that transform the at least one hardware processor to instantiate the at least one profile record.

3. The apparatus of claim 1, wherein the instructions to receive the at least one electronic communication include instructions that transform the at least one hardware processor to receive at least one e-mail communication addressed to the at least one user.

4. The apparatus of claim 1, wherein the instructions to analyze the at least one electronic communication include instructions that transform the at least one hardware processor to identify at least one subject matter associated with the at least one electronic communication.

5. The apparatus of claim 1, wherein the instructions to analyze the at least one electronic communication include instructions that transform the at least one hardware processor to identify at least one user on whose behalf the at least one electronic communication is sent.

6. The apparatus of claim 1, wherein the at least one electronic communication comprises comments from another user of the at least one third-party service.

7. An apparatus comprising at least one physical computer-readable storage medium having stored thereon computer-executable instructions that, when loaded into at least one hardware processor and executed, transform the at least one hardware processor to perform the following:
- sign at least one user into communications platform software;
- access at least one profile record associated with the at least one user; and
- determine whether at least one upsell service offer has been generated for the at least one user, based on at least one electronic communication directed to the at least one user, wherein the at least one upsell service offer comprises
  - at least one offer to the at least one user to log into at least one third-party website from within the communications platform software to access at least one third-party service,
  - access information configured to allow the at least one user to access the at least one third-party service, the access information being integrated into a profile record associated with the at least one user upon acceptance by the at least one user of the at least one upsell service offer, and
  - at least one message indicating the at least one electronic communication from the at least one third-party service that led to generation of the at least one upsell service offer.

8. The apparatus of claim 7, further comprising instructions that transform the at least one hardware processor to determine that the at least one upsell service offer has been generated for the at least one user.

9. The apparatus of claim 7, further comprising instructions that transform the at least one hardware processor to determine that no upsell service offers have been generated for the at least one user.

10. The apparatus of claim 7, further comprising instructions that transform the at least one hardware processor to present at least one representation of the at least one upsell service offer.

11. The apparatus of claim 10, further comprising instructions that transform the at least one hardware processor to present at least one user interface tool that is responsive to user input to accept the at least one upsell service offer.

12. The apparatus of claim 11, further comprising instructions that transform the at least one hardware processor to update the at least one profile record in response to the at least one user accepting the at least one upsell service offer thereby creating at least one updated profile record.

13. The apparatus of claim 12, further comprising instructions that transform the at least one hardware processor to retrieve the at least one updated profile record, and to present at least one user interface tool that is responsive to input from the at least one user to sign the at least one user into the at least one third-party service from within the communications platform software.

14. The apparatus of claim 7, wherein the at least one third-party website comprises at least one social networking website.

15. The apparatus of claim 7, wherein the at least one third-party website comprises at least one media-sharing website.

16. The apparatus of claim 7, wherein the at least one third-party website comprises at least one online merchant website.

17. The apparatus of claim 7, wherein at least one of the electronic communications comprises comments from another user of the at least one third-party service.

18. An apparatus comprising at least one physical computer-readable storage medium having stored thereon computer-executable instructions that, when loaded into at least one hardware processor and executed, transform the at least one hardware processor to perform the following:
- instantiate respective profile records for a plurality of users of communications platform software;
- receive a plurality of e-mail communications directed to respective ones of the plurality of users;
- analyze the plurality of e-mail communications at least to identify subject matter referenced in the plurality of e-mail communications and to identify at least one third-party service sending at least one of the plurality of e-mail communications;
- generate at least one upsell service offer to at least one user of the plurality of users, wherein the at least one upsell service offer comprises
  - at least one offer to the at least one user to log into at least one third-party website from within the communications platform software to access the at least one third-party service,
  - access information configured to allow the at least one user to access the at least one third-party service, the access information being integrated into a profile record associated with the at least one user upon acceptance by the at least one user of the at least one upsell service offer, and
  - at least one message indicating the at least one electronic communication from the at least one third-party service that led to generation of the at least one upsell service offer;
- log the at least one user into the communications platform software;
- access the at least one profile record associated with the at least one user;
- present a representation of the at least one upsell service offer to the at least one user; and
- receive a response to the at least one upsell service offer from the at least one user.

19. The apparatus of claim 18, further comprising instructions that transform the at least one hardware processor to:
- in response to determining that the at least one user has accepted the at least one upsell service offer, update the at least one profile record associated with the at least one user; and
- present at least one user interface to the least one user, wherein the at least one user interface includes at least one user interface tool that is responsive to user activation to log the at least one user into the at least one third-party website from within the communications platform software.

* * * * *